Dec. 7, 1954     E. O. SCHMIDT ET AL     2,696,199
PRECOMBUSTION DIESEL ENGINE
Filed Dec. 28, 1951
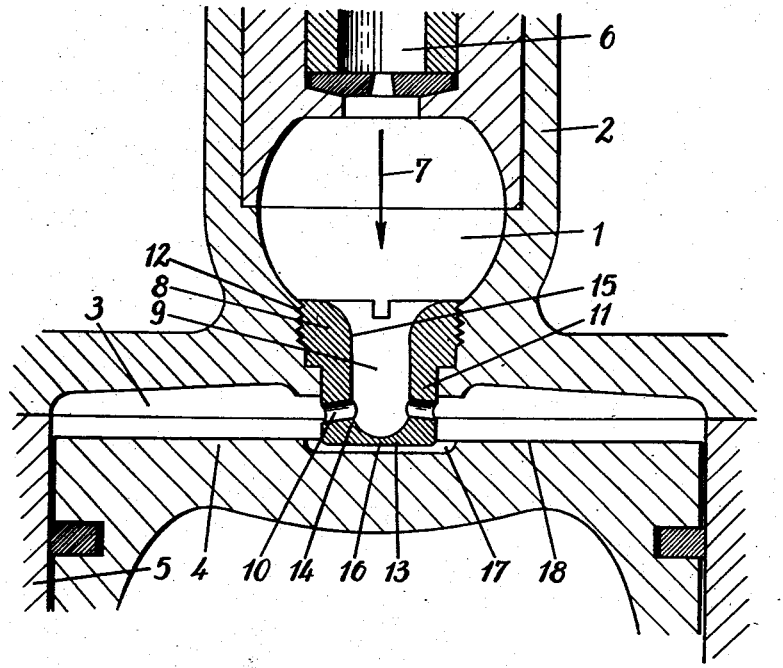
Inventors
Ekhart O. Schmidt and
Wilhelm K. O. Siegle
By Dicke and Padlon
Attorneys

United States Patent Office 2,696,199
Patented Dec. 7, 1954

2,696,199

PRECOMBUSTION DIESEL ENGINE

Ekhart O. Schmidt, Stuttgart-Bad Cannstatt, and Wilhelm K. O. Siegle, Stuttgart, Germany, assignors to Daimler-Benz Aktiengesellschaft, Stuttgart-Unterturkheim, Germany Application December 28, 1951, Serial No. 263,738

6 Claims. (Cl. 123—32)

This invention relates to a precombustion chamber diesel engine and more particularly to such a precombustion chamber diesel engine in which an insert, provided with circumferentially spaced passages and composed of a cylindrical part and a bottom part which closes the latter toward the main combustion chamber or cylinder space, is arranged between precombustion and main combustion chamber. In the known inserts of this kind the bottom is particularly endangered owing to the elevated temperatures occurring within the main combustion and precombustion chambers. The bottom itself absorbs the high temperature and on high engine loads it is possible, even if material of high-grade thermal properties is used, that the bottom will scale or crack and will do so primarily between the circumferentially spaced passages on the bottom which, as a rule, has the result that they crack off completely and under certain circumstances endanger the operation.

The primary object of the present invention is to increase the total life of the inserts and to assure the reliability in service also under high thermal loads.

To this end the present invention contemplates an insert having a bottom which on its inside merges or passes over with substantially rounded corners into its walls, particularly in such a manner that the bottom forms a hemisphere on the side of the large passage where it merges with the walls. Preferably, the slightly downwardly inclined passages flare out toward the inside within the rounded part of the wall.

According to the present invention, moreover, the essentially cylindrical part of the insert is provided with a heavily proportioned wall, the thickness of which measures about half the outer radius of said part.

The following is a description, by way of example, of one precombustion diesel engine construction in accordance with the present invention.

In the construction illustrated in the drawing, the numeral 1 represents the precombustion chamber arranged in the cylinder head 2, the main combustion chamber is designated by 3, and 4 is the piston reciprocating within the cylinder 5. The fuel is injected through the injection nozzle 6 in the direction 7, namely in the direction towards the passage 9, formed by the insert 8, which is in communication with the main combustion chamber by means of (e. g. four to six) lateral and, for example, slightly downwardly inclined passages or bores 10. The integral insert comprises a bottom part 13 and a cylindrical part 11 which with its enlarged upper part is screwed into the cylinder head by means of a thread 12. The bottom 13 is on its inside hemispherically rounded in such a manner that its inner surface merges or passes over into the cylindrical surface 15 of the cylindrical part 11. Along with this, the bores 10 open or flare within the hemispherical part 14 into the passage 9. The cylindrical part 11 is provided with a heavily proportioned wall, the thickness of which equals approximately half the diameter of the passage 9 respectively half the outer radius of the cylindrical part. The bottom part 13 is on its underside bounded by a plane surface 16 which in the upper dead center of the piston enters into a depression 17 of the otherwise, for example, plane piston head 18. Owing to the hemispherical form 14, the heat taken up by the bottom 13 can be passed along without prejudicial stow to the cylindrical part 11 and thence to the water-cooled cylinder head 2 so that the thermal stresses or loads of the insert do not exceed the permissible limit.

The present invention is applicable to all types of internal combustion engines and particularly also to automotive type diesel engines and it is, of course, not limited to the form illustrated and described herein.

What we claim is:

1. In a precombustion diesel engine, an engine housing having a cylinder space, a cylinder head with a precombustion chamber, a piston reciprocating within said cylinder space, an insertion member intermediate the cylinder head and the piston, said member having a passage establishing communication with said cylinder space, said member forming a cylindrical portion protruding into the space and having a bottom part closing the cylindrical portion toward the cylinder space, the bottom part having an inner hemispherical section, outlet openings providing a communication between said precombustion chamber and said cylinder space, said outlet openings being arranged exclusively substantially radially in said cylinder member, said piston having a local depression with side walls located and dimensioned so that in the upper dead center position of said piston the bottom of said local depression approaches closely the bottom of said member and the side walls of said local depression closely surround said bottom of said member.

2. Precombustion chamber diesel engine according to claim 1 in which the bottom of the insertion member has a smaller wall thickness than the cylindrical part of the insertion member.

3. Precombustion chamber diesel engine according to claim 1 in which the recess in the piston head as well as the outside of the insertion member facing the piston head has a plane surface.

4. Precombustion diesel engine according to claim 1 wherein the thickness of the wall of said cylindrical part equals approximately half the outer radius of said part.

5. Precombustion diesel engine comprising an engine housing with a cylinder space, a cylinder head with a precombustion chamber and a passage establishing communication with said cylinder space, a piston having a piston head reciprocating within said cylinder space, an insertion member within said communication passage comprising an essentially cylindrical part protruding into said cylinder space and a bottom part closing said cylindrical part toward said cylinder space, said bottom part merging with hemispherically rounded inner walls into said cylindrical part, a depression in said piston head arranged in a manner whereby in the upper dead center of said piston the bottom part of said insertion member enters said depression, and lateral passages in said insertion member arranged where said cylindrical part merges into said bottom part and outwardly directed over the piston head.

6. Precombustion chamber diesel engine according to claim 1 wherein said outlet openings lead into said cylinder space at a slightly downwardly directed inclination.

References Cited in the file of this patent

UNITED STATES PATENTS

| Number | Name | Date |
|---|---|---|
| 1,260,408 | Leissner | Mar. 26, 1918 |
| 2,292,409 | Steward | Aug. 11, 1942 |

FOREIGN PATENTS

| Number | Country | Date |
|---|---|---|
| 544,508 | Germany | Feb. 18, 1932 |